Aug. 12, 1969   E. H. LAND   3,460,452
SELF-DEVELOPING CAMERA AND PROCESS PERFORMED THEREIN
Filed Sept. 18, 1967   5 Sheets-Sheet 1

FIG. 1

INVENTOR.
Edwin H. Land
BY
Brown and Mikulka
and
Robert E. Corb
ATTORNEYS

FIG. 3

INVENTOR.
Edwin H. Land
BY Brown and Mikulka
and
Robert E. Corb
ATTORNEYS Aug. 12, 1969            E. H. LAND            3,460,452

SELF-DEVELOPING CAMERA AND PROCESS PERFORMED THEREIN

Filed Sept. 18, 1967            5 Sheets-Sheet 4

INVENTOR.
Edwin H. Land

BY Brown and Mikulka
and
Robert S. Corb
ATTORNEYS

INVENTOR.
Edwin H. Land
BY
Brown and Mikulka
and
Robert S. Corb
ATTORNEYS

United States Patent Office 3,460,452
Patented Aug. 12, 1969

3,460,452
SELF-DEVELOPING CAMERA AND PROCESS
PERFORMED THEREIN
Edwin H. Land, Cambridge, Mass., assignor to Polaroid Corporation, Cambridge, Mass., a corporation of Delaware
Filed Sept. 18, 1967, Ser. No. 668,521
Int. Cl. G03b 17/52
U.S. Cl. 95—13        13 Claims

ABSTRACT OF THE DISCLOSURE

A self-developing camera for exposing and processing a film unit including a pressure rupturable container of processing liquid. The camera includes a pair of pressure applying rollers for moving the film unit including the container between the rollers in a first direction during exposure without rupturing the container and then moving the film unit in the opposite direction to rupture the container and distribute its liquid contents within the film unit; and means for preventing exposure of the film unit during processing. One of the rolls is driven to move the film unit during exposure and processing, and the exposure system is coupled with the other roller to be driven thereby. A process is disclosed in which compressive pressure is applied to the rupturable liquid-filled container to distribute its liquid contents immediately prior to rupture of the container and dispensing of its liquid contents.

---

The present invention is generally concerned with a self-developing camera and a photographic process performed thereby, of the type shown and described in the copending U.S. patent application of Edwin H. Land, Ser. No. 549,961 filed May 13, 1966 now U.S. Patent No. 3,405,619, issued Oct. 15, 1968. Cameras of this type are characterized by a relatively small (as compared to image size) and compact structure attributable to the fact that the photosensitive recording medium is moved in one direction relative to the exposure system during exposure and is moved in the opposite direction along essentially the same path during subsequent processing which is performed by components of the exposure system. The exposure system includes optical means for forming an image at an image surface, means providing a shutter aperture at the image surface, means for moving the image in the image surface relative to the aperture and means for moving the photosensitive image-recording medium behind the aperture to maintain the image and recording medium stationary with respect to one another and effect exposure of the recording medium to produce an image therein. Exposure of the image-recording medium occurs during movement thereof past the aperture which, in cooperation with the means for moving the recording medium, functions in the nature of a shutter to initiate and terminate exposures as well as to control the amount of light energy incident on the recording medium.

The camera is designed to be employed with a film unit including a photosensitive image-recording medium in the form of a sheet-like element, a second element superposed with the photosensitive element and a rupturable container of processing liquid located at one end of the film unit in position to discharge its liquid contents between the two elements for distribution therebetween in response to the application of compressive pressure to the container and superposed elements. Processing of the photosensitive element is achieved by moving the film unit, container foremost, between a pair of pressure-applying members, preferably juxtaposed rollers, by rotating at least one of the rollers in engagement with the film unit located between the rollers. Camera compactness is achieved by employing a single pair of rollers as part of the exposure system for moving the film unit in one direction during exposure and as part of the processing system for moving the film unit in the opposite direction to distribute the processing liquid in contact with the exposed photosensitive element. Additional compactness is achieved in the camera structure of the invention by advancing the film unit between the rollers in opposite directions along essentially the same path during both exposure and processing.

It will be apparent that the overall size of the camera of the invention is a function of the size of the film unit since the camera is required to provide the space in which to store the film unit prior to, during and following exposure and processing. It is desirable for this reason as well as for economic reasons, i.e., cost of materials, to provide the smallest film unit construction in relation to image size and to form the film unit of a minimum amount of materials, particularly the minimum quantity of processing liquid required to effect image formation when distributed in contact with an exposed area of the photosensitive element. This minimum quantity of liquid is the amount required to provide a layer of predetermined thickness over a generally rectangular area. It is the usual practice, in order to insure the desired distribution, to supply an amount of liquid in excess of the minimum amount required. In order to minimize the quantity of excess liquid, it is important that the liquid be dispensed from the rupturable container in a uniformly distributed mass so that subsequent spreading of the liquid over a rectangular area will result in full utilization of the available liquid and minimize overrun. The liquid should be dispensed from the container in the form of a uniformly distributed mass extending from edge to edge of the exposed area of the photosensitive element, and this requires that the liquid contents of the container be uniformly distributed within the container prior to rupture of the container and release of the liquid. The camera and process of the invention provide a unique and advantageous system for insuring uniform distribution and release of the liquid contents of the container by providing for the application of compressive pressure to the container insufficient to rupture the container and uniformly distributed throughout the length of the conainer so as to distribute the liquid uniformly within the container. This liquid distribution within the container is effected immediately prior to releasing the liquid contents of the container so that there is no opportunity for the liquid to be redistributed non-uniformly within the container.

Other objects of the invention will in part be obvious and will in part appear hereinafter.

The invention accordingly comprises the apparatus possessing the construction, combination of elements and arrangement of parts and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Reference is now made to FIGURES 1 through 5 wherein there is shown a camera 10 embodying the invention. Camera 10 includes an elongated relatively thin housing comprising rectangular forward and rear walls 12 and 14, side walls 16 and 18, and end walls 20 and 22 joining the forward and rear walls. A section, designated 24, of the housing including a portion of rear wall 14 and side walls 16 and 18 is provided separate from the remainder of the housing and is pivotable with respect to the housing to form a door which may be opened to provide access to the interior of the housing for loading film into the camera and removing film from the camera.

The camera includes an image-forming optical system located in the end of the housing nearest end wall 20 and comprising a multiple element objective lens including a front element 26 and a rear element 28 mounted with the axis of the lens extending in a direction generally parallel with the front and rear walls and end wall 20 and normal to the side walls of the camera housing. Forward wall 12 is provided with an exposure window 30 located near side wall 16 with the center of window 30 aligned with the axis of the objective lens. A mirror 32 is mounted behind window 30 on a shaft 34 for pivotal movement about an axis intercepting the lens axis and extending perpendicularly thereto to define a light path extending in perpendicular (X and Y) directions.

Camera 10 is designed to be employed in a conventional manner to produce a photographic print preferably by a diffusion transfer process. However, the print produced by the camera is relatively large as compared with overall camera size. For example, it may be possible according to the invention to produce a photographic print having image dimensions of the order of 3 x 3 inches utilizing a camera structure incorporating an objective lens with a focal length of about 4½ inches, the camera having dimensions of the order 7 x 4 x ⅞ inches. To accomplish this result, an image-recording medium is exposed in the manner described in the aforementioned U.S. patent of Edwin H. Land in which there is disclosed a camera incorporating an optical system designed to form an image of the scene at an image plane within the camera and means defining a narrow shutter aperture located substantially at this image plane. The shutter aperture is substantially narrow and elongated and extends transversely of the image, and exposures are made (as with a focal plane shutter) by moving the shutter aperture and recording medium relative to one another while maintaining the image formed by the optical system stationary with respect to the recording medium. In the camera of the invention (unlike a focal plane shutter), the shutter aperture remains stationary and the recording medium and image are moved relative to the shutter aperture to expose the recording medium and form an image of the scene therein.

The image-recording medium, which is preferably in the form of a sheet-like element, is processed by a liquid reagent distributed between the recording medium and another sheet-like element by moving the two elements in superposition between a pair of pressure-applying members in the form of juxtaposed rollers. Compactness is achieved by utilizing components of the camera such as the rollers to effect both exposure and processing, by moving the image-recording medium along the same general path in opposite directions within the camera during exposure and processing and by arranging the components of the camera in a novel and improved manner to achieve maximum utilization of the available space. In this latter regard, the means for storing the film prior to exposure and during processing as well as the driving means for the exposure and processing systems are located within a section of the camera housing toward one end thereof, and the exposure system including the image forming optical system and exposure controls are located together in another section of the camera housing toward the opposite end thereof. The means for transporting the recording medium during exposure and processing, i.e., juxtaposed rollers, are located intermediate the aforementioned sections of the housing between the storage and drive systems to one side and the optical and exposure control systems to the other.

In the camera shown, the recording medium is moved during exposure from an initial position within a section of the camera nearest end wall 22 toward the opposite end of the camera, i.e., end wall 20, while the image formed by the objective lens 26, 28 is moved in the same direction and at the same speed.

The camera includes means defining an elongated shutter aperture and for guiding the recording medium past the exposure aperture duing exposure. In the form shown, these last mentioned means comprise a rear guide plate 38 and a forward guide plate 40 located in spaced, face-to-face relation to define a narrow passage therebetween through which a film unit including the image-recording medium is movable. Forward guide plate 40 is formed with a relatively narrow shutter aperture 42 having a length at least equal to one dimension of the image which is to be formed in the recording medium and a width that is a relatively small fraction of the other (length) dimension of the image. The optical system of the camera includes light reflecting elements providing a folded light path between lens 26, 28 and aperture 42 and in the form shown, these reflecting means include a first mirror or prism 44 located adjacent rear lens element 28 and having a reflecting surface disposed at a 45° angle with respect to the lens axis and perpendicularly to the forward and rear walls of the camera housing so as to direct light in a third direction (along a Z axis) from the objective lens toward the opposite end of the camera housing. An optical wedge 46 is provided in the light path from prism 44 for deflecting light towards the front of the camera and a second mirror 48 which reflects the light toward the rear of the camera and a third mirror 50 which in turn reflects the light toward the front of the camera and end wall 20 to a fourth mirror 52 which reflects the light toward shutter aperture 42. The series of mirrors and the wedge comprising the portion of the optical system located behind the objective lens perform two important functions; namely, folding the relatively long optical path into a relatively compact space and providing for an odd number of reflections necessary to produce a correct appearing image by a process which will be described more fully hereinafter.

The image formed by lens 26, 28 is moved relative to aperture 42 so as to remain stationary with respect to the moving film by pivoting mirror 32 about the axis of shaft 34 in synchronism with the movement of the recording medium. It is contemplated that one or more of the other mirrors may also be moved during exposure in order to compensate for or correct image distortions which may be inherent in the optical system and/or result from the method of exposing the recording medium.

As a rule, most cameras include means for controlling exposure, that is, for controlling the light energy reaching the recording medium. Conventional means for this purpose include means for varying exposure duration and means for varying the lens aperture. In the camera of the invention, the exposure duration (as in the case of a focal plane shutter) is a function of the shutter aperture width and the speed of movement of the recording medium relative to the aperture and either or both of these factors may be varied to control exposure duration. In the form of the camera shown, the speed of the film movement and the width of the shutter aperture remain constant and exposure is controlled by varying an aperture or stop associated with the lens. This variable aperture is shown in FIGS. 2 through 5 as comprising a flexible strip 54 having end sections 56 and 58 located in superposition and formed, respectively, with rectangular or diamond shaped apertures 60 and 62. End sections 56 and 58 are located between lens elements 26 and 28 in a position such that when apertures 60 and 62 are aligned, the centers of the apertures are located substantially at the axis of the lens elements. Strip 54 includes a medial section 64 engaged around a shaft 66 and secured to the shaft so that rotation of the latter is effective to move end sections 56 and 58 in opposite directions relative to one another, thereby altering the size of the lens aperture defined by the intersection of apertures 60 and 62 in end sections 56 and 58. A knob 68 is provided on shaft 66 and extends through an opening in side wall 16 of the camera housing where the knob may be manually engaged for rotating shaft 66 to vary the shutter aperture. Suitable guides in the form of a post 70 and tracks 72 are provided for properly locating and guiding strip 54 while permitting movement of the end sections of the strip relative to one another between lens elements 26 and 28.

Figure 6:
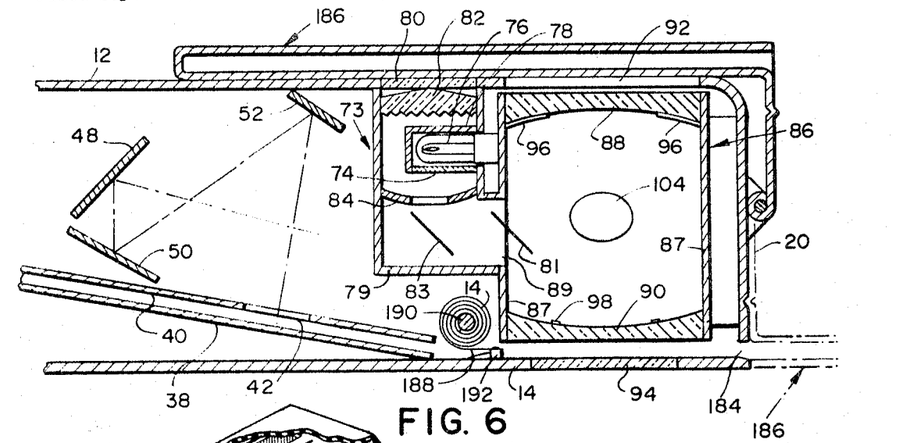
FIG. 6 is an enlarged sectional view taken substantially along the line 6—6 of FIG. 3.

The camera includes a view finder and a comparison photometer visible through the view finder and coupled with shaft 66 for aiding in setting the diaphragm aperture provided by strip 54. In the form shown in FIG. 6, the comparison photometer, generally designated 73, comprises a lamp 76 enclosed in an opaque housing 78 for illuminating a light-transmitting target 74 forming a window in housing 78. A pair of mirrors 81 and 83 are provided for enabling the operator to view target 74 through the view finder (to be described hereinafter) of the camera. A housing 79 is provided for enclosing the components of the photometer which enables the operator to compare the known brightness of the lamp with the brightness of the scene. To enable this comparison, the forward wall 12 of the camera is provided with a window 80 in which is mounted a light integrating element 82 adapted to transmit light from the scene to a mirror 84 which, in turn, reflects the light from element 82 onto target 74 illuminating the target from the front, i.e., the side thereof seen by the operator. The photometer is employed by varying the brightness of lamp 76 until the light incident on target 74 from the subject bears a predetermined relationship to the light incident on the target from lamp 76. This is accomplished by coupling a rheostat in circuit with lamp 76 and operating the rheostat by knob 68 so that rotation of the knob and shaft 66 is effective to simultaneously vary the brightness of lamp 76 and the size of the lens aperture in a predetermined relationship. In fact, the rheostat (not shown) may be incorporated in knob 68 and/or shaft 66 in order to conserve space.

As previously indicated, the camera includes a view finder generally designated 86. View finder 86 is of the conventional projected frame type comprising a housing 87 mounting front lens element 88 and a rear lens element 90, mounted between windows 92 and 94 in forward wall 12 and rear wall 14 respectively. The comparison photometer is coupled with the view finder with mirror 81 of the photometer being located adjacent an opening 89 in the view finder housing. The rear surface of forward lens element 88 is silvered or otherwise rendered reflective near its margins to form a mirror designated 96 enabling the viewer to observe the scene through lens 88 while at the same time viewing a frame 98 formed on the forward surface of lens element 90.

A range finder is employed in conjunction with the view finder and is coupled with objective lens element 26 so as to move the latter for focusing lens 26, 28. The view finder is of the split field type comprising a window 100 in forward wall 12 for admitting light to a mirror 102 disposed at a 45° angle with respect to the direction in which the camera is facing for directing light from the scene toward view finder 86 and a circular reflecting surface 104 located in the view finder on the axis of lens elements 88 and 90 in a plane substantially parallel with the plane of mirror 102 enabling the operator to view the scene by light transmitted along two paths separated by the spacing between the view finder and window 100. A pair of optical wedges including a rotary wedge 106 are located between window 100 and mirror 102 for deviating one of the light paths and focusing is accomplished by rotating wedge 106 to align the circular center portion of the scene viewed by way of reflecting surface 104 with the surrounding portion of the scene viewed directly through the view finder.

Rotary wedge 106 is mounted in a lever 108 pivotally connected to a plate 110 mounted for reciprocating motion transverse the camera housing in a direction parallel with the axis of lens 26, 28. Front lens element 26 is mounted for motion along its axis and is engaged with plate 110 and means in the form of a rotary knob 112 projecting through an opening in side wall 18 of the camera housing are provided for reciprocating plate 110 to rotate wedge 106 and alter the position of front lens element 26. Plate 110 is coupled with knob 112 by way of a pin 114 mounted on the knob and engaged in a slot 116 in plate 110.

Figure 7:
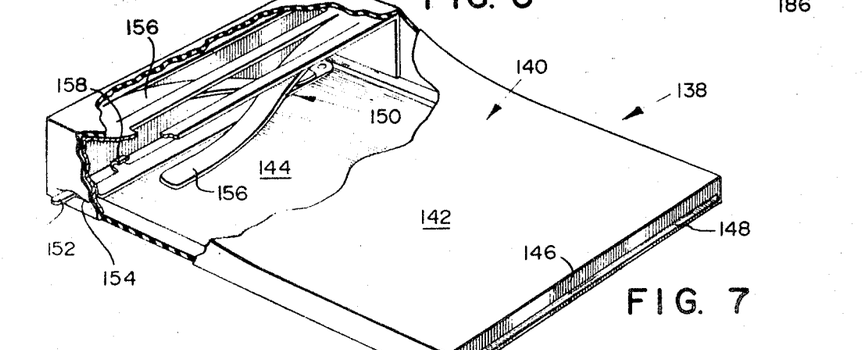
FIG. 7 is a perspective view, partially in section, illustrating a film assemblage useful in the camera of the invention.
Figure 8:
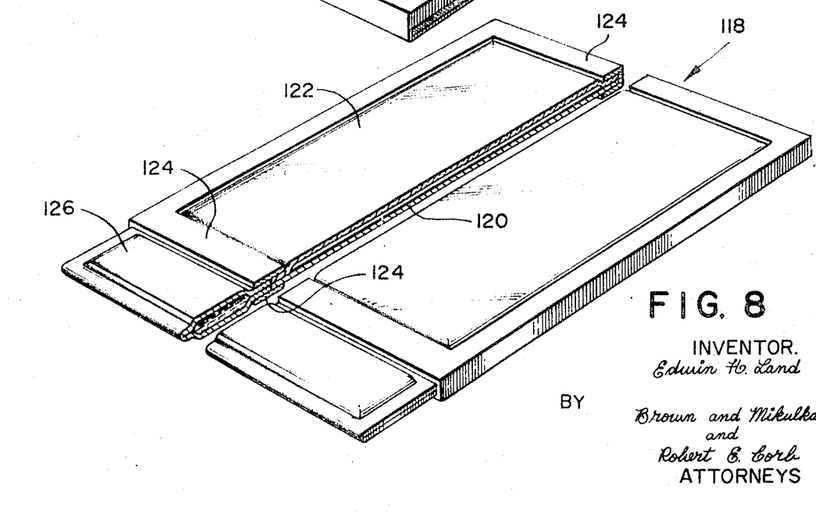
FIG. 8 is a sectional view of a film unit incorporated in the assemblage of FIG. 7.

The camera of the invention is designed to employ film units of the type shown in FIG. 8 and assembled in a film pack such as shown in FIG. 7. The film unit designated 118 preferably includes all of the materials required to produce a photographic print and may be of the type shown and described in detail in the copending U.S. patent application of Edwin H. Land et al. Ser. No. 622,286 filed Mar. 10, 1967. This film unit generally comprises a rectangular photosensitive sheet 120 preferably formed of a light-opaque support carrying a layer of a photosensitive image-recording material such as silver halide on its forward surface and a transparent second or image-receiving sheet 122 secured in face-to-face relation with sheet 120 by a retaining element 124 in the form of a frame secured to the margins of the sheets. A rupturable container 126 of processing liquid is secured to the two sheets 120 and 122 at an edge of the space between the sheets in position to release its liquid contents between the sheets when subjected to compressive pressure. The photosensitive sheet 120 is adapted to be exposed by light transmitted through second sheet 122 and following exposure, the liquid contents of container 126 are spread in a thin layer between the sheets by the progressive application of compressive pressure to the container 126 and succeeding sections of the film unit toward the opposeite end thereof from the container. The liquid contents of the container are preferably adapted, when distributed between the sheets, to react with the photosensitive material to produce between the sheets a visible image which is preferably a positive transfer image formed between (or on) the inner surface of sheet 118 and an opacifying material provided in the liquid for forming a layer behind the image capable of masking the exposed and processed photosensitive material.

Rupturable container 126 is formed of a rectangular blank of a fluid impermeable sheet material folded lengthwise upon itself to form two walls which are sealed to one another at their ends and along one longitudinal edge to define an elongated cavity 128 filled with the processing liquid. The longitudinal edge portions designated 130 of the container are sealed together so as to become unsealed to form a mouth for releasing the liquid in response to the generation of hydraulic pressure with the liquid contents of cavity 128. As previously noted, the quantity of processing liquid supplied in the container cavity is preferably only slightly in excess of the amount required to form a layer of uniform predetermined depth over a rectangular area between photosensitive sheet 120 and second sheet 122. To achieve the most complete utilization of the processing liquid and distribution over the entire exposed area, the liquid should be discharged from the container (for distribution between the sheets) as a uniformly distributed elongated mass extending from side to side of the area over which it is to be spread. This is accomplished by forming cavity 128 with a substantially uniform cross section throughout a length substantially equal to the width of the area over which the liquid is to be spread and providing an agent in the liquid for rendering the liquid viscous so that the discharge mouth ruptures throughout the entire length of cavity 128 when compressive pressure is applied thereto.

A plurality of film units 118 may be assembled in a suitable container to form a film pack designated 138 comprising a container 140 including forward and rear walls 142 and 144 respectively, and an end wall 146 formed with an opening 148 permitting the movement of a film unit 118 from the interior of container 140. Container 140 provides a light-tight environment for the film units and also includes means for feeding the film units, one at a time, from the container through opening 148. In the form shown, these last mentioned means include a lever 150 pivotally mounted at one end on rear wall 144 with its other end section, designated 152, extending through a slit 154 in a side wall of container 140 where the end section may be engaged for pivoting the lever. Film units 118 are mounted in stacked relation within container 140 with containers 126 of the film units located within an enlarged end section of container 140 overlying lever 150. Lever 150 is provided with an engagement member 156 for engaging the edge of the container 126 of the rearmost film unit 118 (located closest rear wall 144) when lever 150 is pivoted for pushing the opposite end of the film unit through opening 148 in end wall 146. Spring means designated 156 are provided within the end section of the container 140 enclosing containers 126 for urging the containers rearwardly to insure engagement of the rearmost container 126 by engagement member 158 when the lever 150 is pivoted (in a counter-clockwise direction viewing FIG. 7) to advance a film unit from container 140 through opening 148.

Movement of a film unit during exposure and processing, as well as spreading of the processing liquid between the sheets of the film unit, is effected by a pair of pressure applying rollers 160 and 162 mounted in juxtaposition with their axes substantially in a common plane intermediate the ends of a camera housing and slightly closer to the end of the housing including the optical system. Roller 160 is mounted at its ends for rotation about a fixed axis closely adjacent rear wall 14 and roller 162 is mounted for rotation on (the ends of) a pair of arms 164 mounted at their opposite ends on a shaft 166 pivotally mounted adjacent forward wall 14 adjacent the same side of roller 160 as the optical system of the camera. Torsion springs 168 are engaged around shaft 166 for biasing the shaft in a counter-clockwise direction (viewing FIG. 4) to urge roller 162 toward roller 160 so as to apply compressive pressure to a film unit located between the rollers.

The camera includes drive means in the form of an electric motor 170 and batteries 172 for powering the motor for driving roller 160 to move a film unit during exposure and processing and moving components of the optical system including mirror 132 so as to move the image formed by the optical system in synchronism with movement of the recording medium of the film unit during exposure thereof. Motor 170 is coupled in driving relation with a roller 160 by a gear train including a first gear 174 keyed to the motor shaft and coupled with a drive gear 176 coupled with one end of roller 160 through a pair of transfer gears 178. Motor 170 is preferably of a high speed type and the gear train comprising gears 174, 176 and 178 serves to increase the torque applied to roller 160 while reducing the speed of rotation of the roller to provide for movement of the film unit at a predetermined linear speed. A typical linear speed suggested by way of example in the aforementioned U.S. Patent No. 3,405,619, is nine inches per second thus providing for an exposure duration of $\frac{1}{60}$ second employing a shutter aperture having a width of 0.15 inch. A typical image size, also given by way of example in the same application, is three inches square so that the total time required for exposing the film unit being moved at linear rate nine inches per second past the shutter aperture will be $\frac{1}{3}$ second.

The portion of the camera housing to the side (left) of rollers 160 and 162 opposite the exposure system is designed to enclose film pack 138 and the drive system including motor 170 and batteries 172, and this section of the camera housing is preferably just sufficiently long to accommodate the film pack between the rollers and end wall 22. The film pack, in turn, is only slightly longer than the individual film units which it contains and these are equal in length to the image area plus a border to be formed at opposite ends of the image area and the width of liquid carrying container 126. By way of example, a typical film pack containing film units producing three inch square images may be approximately 4.25 inches in length. The major portion of the film pack, that is, the portion enclosing the sheets of the film units contained in the pack, is relatively thin so that there is ample space between this portion of the film pack and forward wall 12 of the housing for containing motor 170 and batteries 172. Door 24, in the form shown, is preferably at least equal in length and width to film pack 138 and provides access to the interior of the housing for loading a film pack into the housing into the position shown in FIG. 4. Means such as a clip 180 are provided in the housing for engaging the film pack in the region of end wall 22 for retaining the film pack in the housing. Springs 182 are provided on door 24 for engaging and pressing against the film pack when the door is closed and in this manner also function to hold the film pack in the operative position shown.

A film unit is exposed by advancing it from the film pack into the bite of rollers 160 and 162 and emerging motor 170 to rotate roller 160 in a clockwise direction for advancing the film units between guides 38 and 40 (to the right) past shutter aperture 42 toward end wall 20 of the camera housing. Since the section of the camera housing (to the right of rollers 160 and 162) enclosing the exposure system is shorter than the film unit which is advanced completely between the rollers, means (not shown) may be provided for guiding the film unit around a U-shaped turn so that it remains within the camera housing, or in the embodiment shown, these means include a slot 184 in end wall 20 adjacent rear wall 14 for allowing the film unit to pass behind view finder 86 between the latter and rear wall 14 and then through opening 184 from the camera housing. The camera includes means providing a chamber aligned with slot 184 for receiving the film unit as it is advanced through opening 184, and in the form shown, these means comprise a relatively thin, flat container 186 mounted on end wall 20 for pivotal movement between an inoperative position (shown in FIG. 6) in which it is located adjacent forward wall 12 in covering relationship to the windows therein and an operative position (shown in broken lines) in which container 186 is aligned with opening 184 for receiving a film unit projecting through the opening. Thus, in its inoperative position container 186 functions as a protective covering for the exposure system, view finder, range finder and photometer of the camera, and in its operative position functions as an extension of the camera housing for receiving and temporarily containing a portion of a film unit during exposure and processing thereof.

It will be apparent that the film unit is subject to being exposed as it is moved between view finder 86 and rear wall 14 by light transmitted through the view finder and accordingly means are provided in the camera for preventing exposure of the recording medium to light from this source. In the form shown, these means comprise a light-opaque curtain 188 coiled about a shaft 190 located between the ends of guide plates 38 and 40 and view finder 86 near the path of movement of the film unit. An engagement member 192 is provided on the end of curtain 188 for engaging the leading edge of a film unit as the latter moves from between guide plates 38 and 40 toward the passage provided between rear wall 14 and rear lens element 90 of view finder 86 causing the curtain to become uncoiled and moved together with the film unit between the latter and the view finder as the film unit is advanced behind the view finder into the chamber provided by container 186. Since the rear of photosensitive sheet 120 of the film unit is light-opaque, light admitted to the interior of the camera housing through window 94 will not expose the film unit although the film unit will temporarily obscure the view finder and prevent its use during actual exposure of the film unit and during a portion of the processing cycle. A torsion spring (not shown) is provided coupled with shaft 190 for retracting curtain 188 to its initial position (shown in FIG. 6) as the film unit is advanced in the opposite direction subsequent to exposure and during processing.

Figure 1:
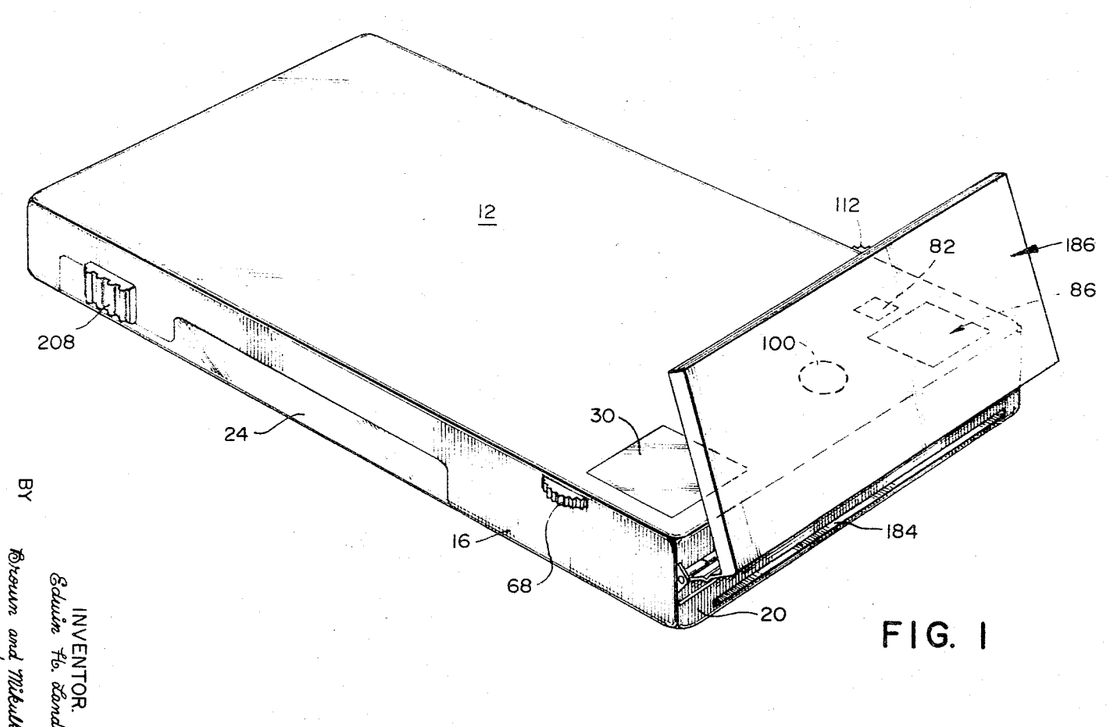
FIGURE 1 is a perspective view of a camera embodying the invention.
Figures 2, 10:
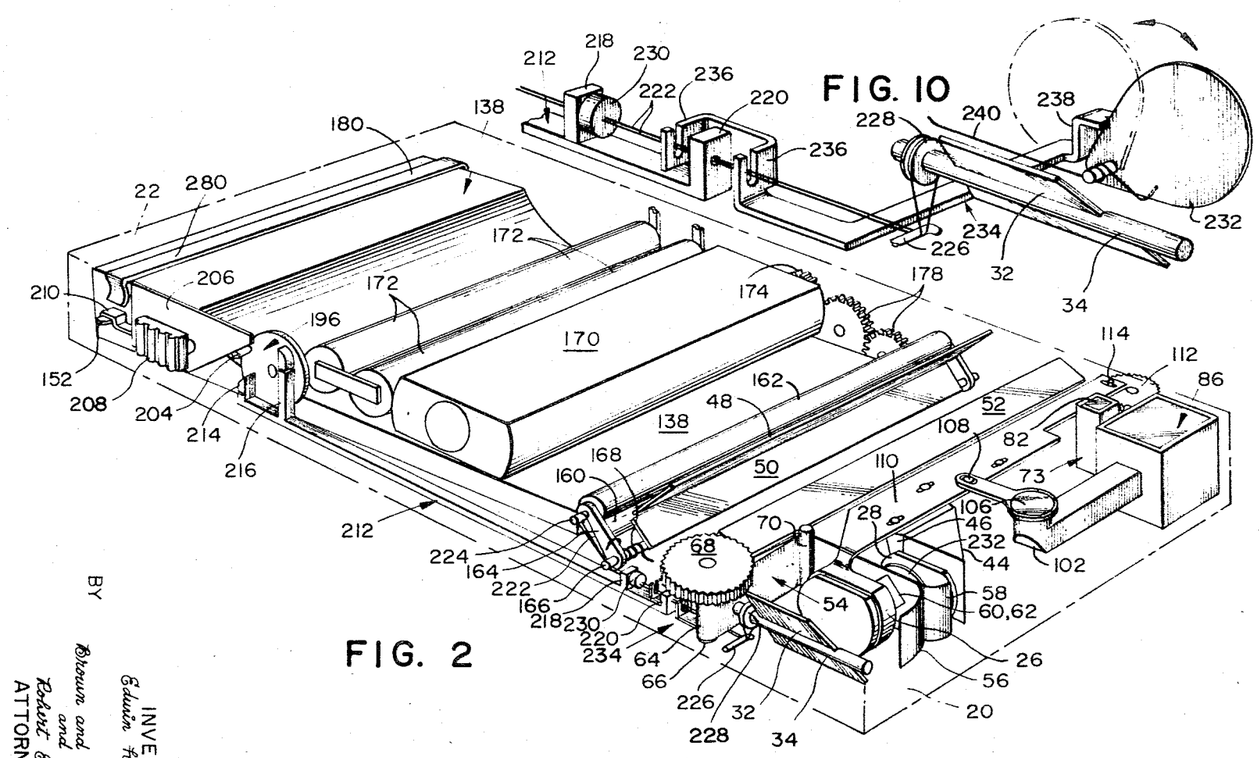
FIG. 2 is a perspective view of the camera showing the internal components thereof.
FIG. 10 is a perspective view of components of the camera.
Figure 3:
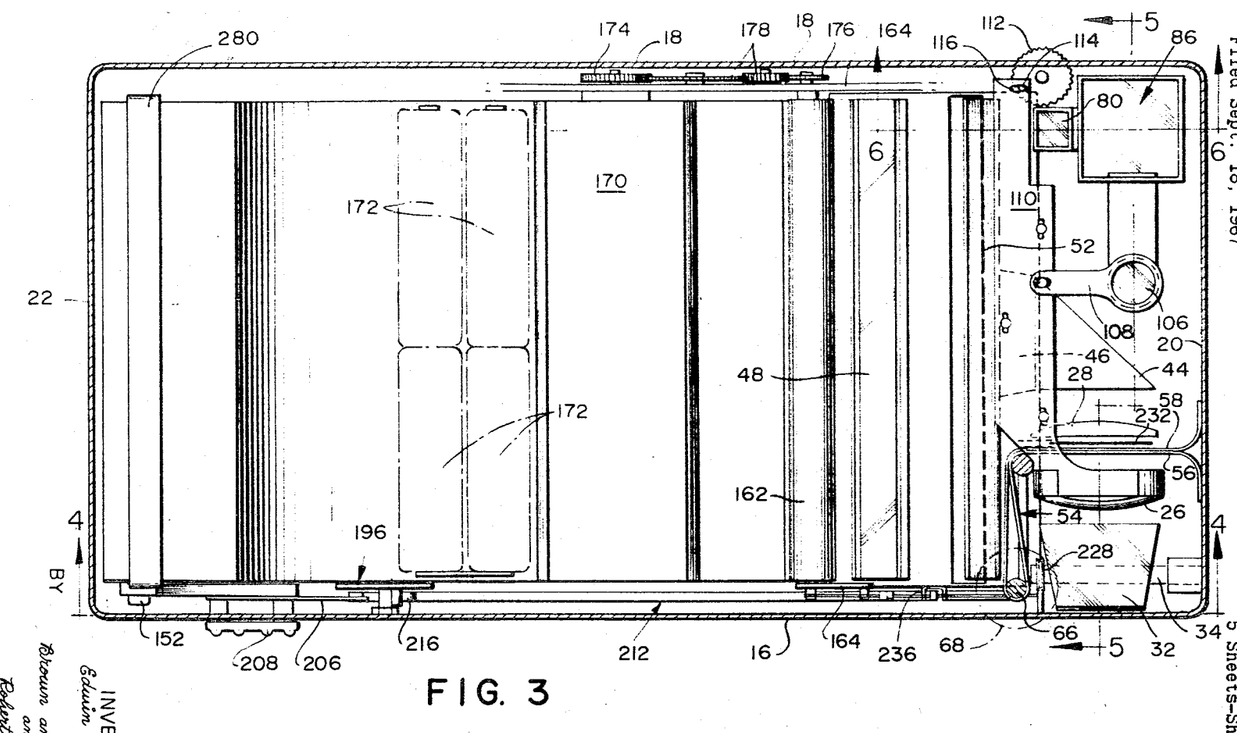
FIG. 3 is a plan view of the camera with a wall thereof removed.
Figure 4:
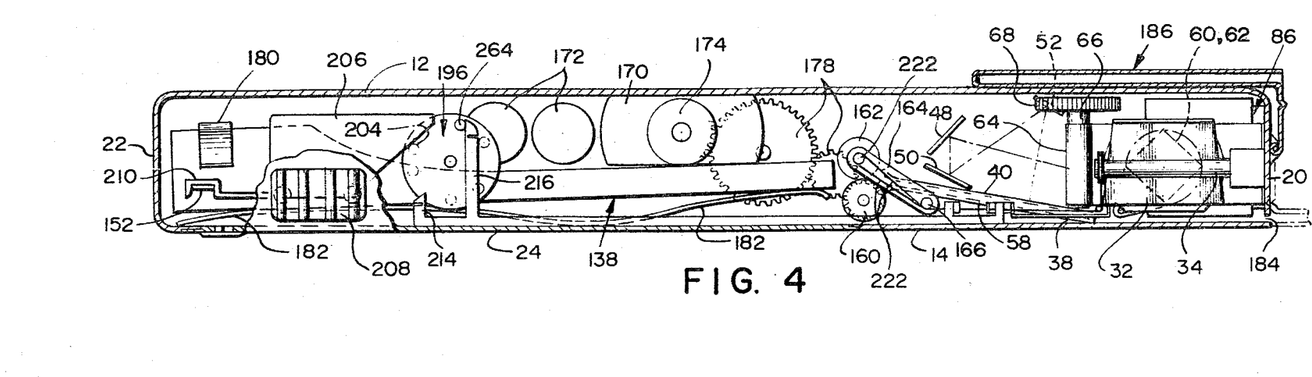
FIG. 4 is an elevational sectional view taken substantially along the line 4—4 of FIG. 3.
Figures 5, 9:
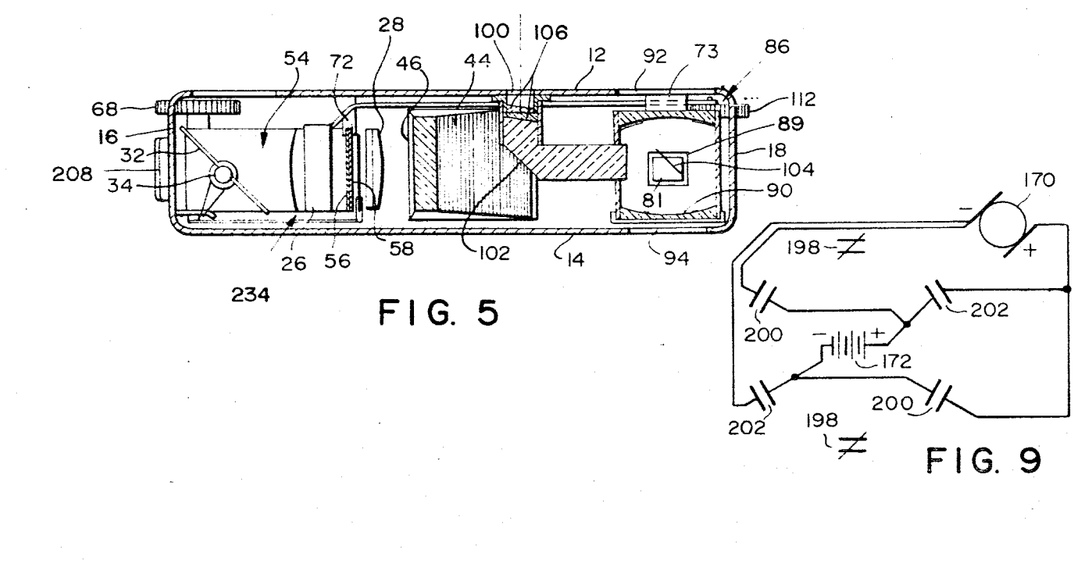
FIG. 5 is a sectional view taken substantially along the line 5—5 of FIG. 3.
FIG. 9 is an electrical diagram illustrating components of the camera.

The camera includes means for initiating and controlling the operation of motor 170 to expose and process a film unit and for pivoting lever 150 to feed a film unit from the film pack into the bite of rollers 160 and 162. In the form shown (most clearly in FIGS. 2, 9, and 10), these means comprise a rotary switch 196 coupled between batteries and motor 170 for initiating and controlling the operation of the motor. Switch 196 includes 6 pairs of contacts symmetrically arranged about a rotary pole designed to close opposed pairs of contacts simultaneously, the opposed pairs of contacts being designated 198, 200, 202. Pairs of contacts 198 are connected to nothing and are adapted to be closed when motor 170 is inoperative. Pairs of contacts 200 are coupled in series with batteries 172 and D.C. motor 170 for operating the motor in a direction for rotating roller 160 in a clockwise direction (viewing FIG. 4) to advance a film unit from the film pack past shutter aperture 42 to effect exposure of the film unit. Pairs of contacts 202 are connected in series with motor 170 and batteries 172 so that when closed, the polarity of the batteries is reversed with respect to motor 170 thereby reversing the direction of rotation of the motor and roller 160 to move a film unit in the opposite direction behind the film pack between the latter and section 124. Switch 196 is of a conventional spring loaded detent type in which it is necessary to rotate the movable element through a relatively few degrees from one position toward the next position whereupon a spring in the switch causes the pole to rotate to the next position at which the next succeeding pair of contacts are closed. The rotary pole of the switch is actuated by a stud 204 projecting outwardly toward side wall 16 of the camera housing and is shown in FIGS. 2, 9, and 10 in the off position, e.g., prior to commencement of an exposure and processing cycle, in which pairs of contacts 198 are closed and pairs of contacts 200 and 202 are open.

Manually operable means are provided for feeding a film unit into the bite of rollers 160 and 162 and closing pairs of contacts 200 to initiate an exposure and processing cycle. These means include a reciprocating cam 206 movable lengthwise of the camera housing and coupled with a manually engageable button 208 located externally of the camera housing adjacent side wall 16.

When button 208 is moved toward the opposite end of the camera housing (to the right in the drawings), cam 206 engages stud 204 causing the latter to rotate through 120 degrees closing contacts 200 and thereby energizing motor 170 to drive roller 160. An engagement member 210 is coupled with cam 206 and button 208 for engaging end section 152 of lever 150 for pivoting lever 150 at the same time button 208 is moved to the right, thereby feeding a film unit 118 engaged by engagement member 158 on lever 150 into the bite of rollers 160 and 162 so that rotation of rollers 160 is effective to advance the film unit between the rollers and expose the film unit.

The control system of the camera includes means for rotating the pole of switch 196 to open contacts 200 and close contacts 202 after exposure has been completed and thereby reverse the direction of rotation of motor 170 and roller 160 to advance the film unit in the opposite direction between the rollers to process the film unit. These means include an elongated bar 212 mounted for reciprocating movement adjacent side wall 16 of the camera housing having on one end thereof first and second arms 214 and 216 extending forwardly adjacent switch 196 for engaging stud 204 on the switch and rotating the pole of the switch. The control system includes a lost motion device for moving bar 212 from the initial position shown in FIG. 2 in the direction of motion of the film unit during exposure to an intermediate position. During this motion, arm 214 engages and moves stud 204 which in turn rotates the pole of switch 196 so as to open contacts 200 and close contacts 202 and thereby terminate the exposure movement of the film unit and initiate the processing movement of the film unit in the opposite direction. This lost motion device includes third and fourth arms 218 and 220 respectively mounted in spaced relation at the end of bar 212 opposite arms 214 and 216 and an endless flexible wire or filament 222 in driving engagement with a shaft 224 extending from an end of roller 162. Wire 222 extends from shaft 224 around a portion of the periphery of shaft 166 which functions as a guide and through openings in third and fourth arms 218 and 220, around a guide 226 to a pulley 228 mounted on shaft 34 so that rotation of roller 162 is transmitted by way of wire 222 to shaft 34 for rotating mirror 32. A rider 230 is mounted on one loop of wire 222 for reciprocating movement between third and fourth arms 218 and 220 in response to rotation of roller 162. Rider 230 is movable from an initial position (shown in the drawings) adjacent third arm 218 toward the right into engagement with fourth arm 220 to move the latter and bar 212 to the right thereby causing first arm 214 to engage stud 204 actuating switch 196 to reverse the polarity and direction of rotation of motor 170. Rider 230 immediately commences to move in the opposite direction as roller 162 is rotated in the opposite direction until it engages third arm 218 moving the arm and bar 212 toward their initial positions causing second arm 216 to engage stud 204 rotating the pole of the switch to open contacts 202 thereby discontinuing the flow of current to motor 170 and terminating the process operation of the camera.

It should be noted that the controls for the motor drive and the means for rotating mirror 32 during exposure are driven from roller 162 which, in turn, is driven through frictional engagement between a film unit and by roller 160, which means that the exposure system, specifically mirror 32, is operated only during movement of a film unit between the rollers and in synchronism with the moving film unit. Thus, if for some reason the film unit should fail to be engaged between the rollers at the start of a processing cycle, the exposure system will not operate and in any event, the exposure system begins to operate at precisely the same instant that the film unit commences to move so that synchronism between the two is positively assured. For this reason, both rollers 160 and 162 which function as part of the exposure system as well as the processing system should have a relatively high coefficient of friction and should have a constant predetermined diameter. Rollers especially designed for this purpose are disclosed in the copending U.S. patent application of John W. Odiorne, Ser. No. 648,500 filed June 23, 1967 entitled Roller Structure and Method of Manufacture.

During exposure of a film assembly, mirror 32 is pivoted in one direction to move the image formed at aperture 42 relative to the aperture in the same direction and at the same speed as the film unit to retain the image and the film unit stationary with respect to one another. During processing, the film unit is moved and the roller is rotated in the opposite direction thereby returning the roller to its initial position in readiness to make another exposure. Since the mirror is coupled with motor 170 through a transmission including the film unit, the proper degree of rotation of the mirror in synchronism with the motion of a film unit is positively assured.

During processing of the film unit, i.e., movement thereof toward end wall 22 of the camera housing, the photosensitive recording medium of the film unit moves behind aperture 42 in position to be exposed by light transmitted by the image-forming optical system and accordingly means are provided for preventing exposure of the film unit during the processing cycle. In the form shown, these means comprise a capping blade or cover element 232 illustrated in FIG. 10 mounted between lens elements 26 and 28 for pivotal movement between a closed position (shown in FIG. 2) in the path of light through lens 26, 28 and an open position in which the path of light through the lens is unobstructed. A lost motion device is provided for pivoting capping blade 232 to its closed position at the end of an exposure cycle and pivoting it into its open position at the termination of a processing cycle so that the capping blade prevents exposure of the film unit during processing movement thereof. This lost motion device comprises an L-shaped link 234 mounted for reciprocating motion in the same direction as bar 212. Link 234 includes a pair of spaced arms 236 located adjacent opposite sides of fourth arm 220 for engagement by fourth arm 220 during movement of the latter to the right; and an end section 238 for engaging capping blade 232 to pivot the latter against the bias of a torsion spring 240 into its closed position. Spring 240 is a relatively weak hair spring designed to pivot blade 232 into an open position when link 234 is moved (to the left) so as to disengage end section 238 from the capping blade at the termination of the processing cycle. In an alternative structure (not shown) the lens diaphragm defined by strip 54 may be closed during processing to prevent double exposure of the recording medium.

While the construction of container 126 enables the discharge of the processing liquid as a uniformly distributed mass, it may not insure such discharge because the sheet material of the container is flexible and the processing agent, being a liquid, may shift within cavity 128. For example, prolonged storage of container 126 with one end lower than the other may result in migration of some of the liquid contents of cavity 128 toward the lower end of the cavity so that the mass of liquid (discharged from the container) will be unevenly distributed and this, in turn, may result, at the opposite end of the rectangular image area, in excess liquid at one side of the image area and insufficient liquid at the opposite side of the image area. In accordance with the invention, the camera is designed to insure that the processing liquid contained in cavity 128 of container 126 is uniformly distributed from end to end of the cavity immediately prior to discharge of the liquid contents of the cavity. This is accomplished by applying uniformly distributed compressive pressure to the cavity insufficient to rupture the container and release its liquid contents, yet sufficient to re-distribute non-uniform liquid within the cavity.

According to the invention, film unit 118 including container 126 is advanced completely between rollers 160 and 162 during exposure and compressive pressure insufficient to rupture container 126 is applied to the container to distribute its liquid contents during the exposure movement. The motion of the film unit is discontinued with the edge of container 126 located in the bite of rollers 160 and 162 so that upon resumption of rotation of roller 160 in the opposite direction (counterclockwise viewing FIG. 4), the film unit will be engaged and moved between the rollers to effect processing thereof. Rollers 160 and 162 are so mounted with respect to one another as to apply compressive pressure to the container of the film unit during movement thereof between the rollers in both directions yet this pressure is insufficient to rupture container 126 when the latter is moved to the right and is sufficient to rupture the container and spread its liquid contents between the sheets during movement of the film unit to the left. The application of differential pressure is obtained by virtue of the mount of roller 162 on arms 164 pivoted about a shaft 166 located to the right of the spread rollers. Thus, as a film unit is moved to the right between rollers 160 and 162, it tends to pivot arms 164 in a clockwise direction against the bias of spring 168 thereby reducing the pressure exerted by the rollers due to the bias of spring 168. However, during movement of the film unit in the opposite direction, i.e., to the left, the force exerted on roller 162 is almost radial with respect to the axis of shaft 166 so that there is little or no component of force resulting from motion of the film unit tending to pivot roller 162 apart from roller 160 and thereby reduce the pressure exerted by the rollers on the film unit.

During the processing cycle, the film unit being moved (to the left) between rollers 162 is advanced by the rollers behind film pack 138 between the latter and springs 182 which hold the film pack within a light-free environment until image formation is complete. When processing, that is, image formation, is complete, the door defined by section 24 of the camera housing may be opened to permit removal of the processed film unit from the camera.

It will be appreciated that the camera thus described achieves the objects of the invention, including an extremely compact structure in which a film unit is exposed and processed to produce a photographic print. The film unit is moved in opposite directions during exposure and processing, the latter being effected by a liquid supplied in a rupturable container comprising a component of the film unit. The process involves uniformly distributing the liquid within the container immediately prior to dispensing the liquid therefrom for distribution within the film unit to effect the processing of a photosensitive recording medium. The exposure and processing systems of the camera include components common to both systems, namely, the means for advancing the film unit in one direction during exposure and in the opposite direction while distributing a processing liquid within the film unit. The same elements common to both the exposure and processing systems are a pair of juxtaposed rollers that are also effective to distribute the liquid within the container as well as to distribute the liquid from the container within the film unit. The film unit is guided along essentially the same path past a shutter aperture during both exposure and processing and the camera includes means for preventing exposure of the film unit during the processing cycle.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing a photographic film unit including a photosensitive element and a rupturable container of processing liquid attached to the photosensitive element near one end thereof and adapted to release its liquid contents unidirectionally in response to application of compressive pressure, said apparatus comprising, in combination:

a pair of rolls;

mounting means supporting said rolls in juxtaposition for rotation about axes lying substantially in a plane and urging said rolls toward one another into frictional engagement with a film unit engaged between said rolls;

holding means for locating a photographic film unit in an intial position to one side of said rolls with the container of said film unit located furthest from said rolls;

exposure means including an exposure station for exposing a region of the photosensitive element of a film unit during movement thereof through said exposure station;

drive means for rotating at least one of said rolls in frictional engagement with said film unit to move said film unit, including said container, in one direction between said rolls and through said exposure station for exposing said photosensitive element; and means for reversing the direction of rotation of said one roll following exposure of said photosensitive element to move the latter in the opposite direction between said rolls;

said mounting means including means for biasing said rolls toward one another with a force insufficient to rupture said container during movement of said film unit in said one direction and biasing said rolls toward one another with a force sufficient to rupture said container and distribute its liquid contents in contact with the exposed photosensitive element during movement of said film unit in said opposite direction.

2. The photographic apparatus of claim 1 wherein said exposure station is located to the side of said rolls opposite said holding means.

3. The photographic apparatus of claim 1 wherein said mounting means include support means pivotable about an axis located to the side of said rolls opposite said holding means and on the same side of the path of movement of said film unit between said rolls as said one roll for supporting the other of said rolls in juxtaposition with said one roll and spring means coupled with said mounting means for biasing said other roll toward said one roll.

4. Photographic apparatus as defined in claim 1 including obturator means movable into the path of light transmitted by said exposure means for preventing exposure of said photosensitive element in said exposure plane, said drive means being coupled with said obturator means for moving said obturator means into said path of light during the terminal portion of the movement of said film unit in said one direction.

5. Photographic apparatus as defined in claim 1 wherein said rolls are spaced from one another by a distance less than the minimum thickness of said film unit, said drive means are coupled with one of said rolls for rotating said one roll, and said exposure means include means for forming an image at said photosensitive element in said exposure station and move said image relative to said exposure station to maintain said image stationary with respect to said photosensitive element during exposure of the latter, the other of said rolls being coupled in driving relation with said last-mentioned means to cause the latter to move said image only during movement of said film unit between and in engagement with said rolls.

6. Photographic apparatus as defined in claim 5 including obturator means movable into the path of light transmitted by said exposure means for preventing exposure of said photosensitive element in said exposure plane, said other roll being coupled in driving relation with said obturator means to move the latter into said light path during the terminal portion of movement of said film unit in said one direction to prevent exposure of said photosensitive element during movement of said film unit in said opposite direction.

7. Photographic apparatus as defined in claim 6 including means for moving said obturator means out of said light path prior to movement of said film unit in said one direction.

8. Photographic apparatus for moving a photographic film unit and exposing the photosensitive element of said film unit comprising, in combination;

exposure means for forming an image on the photosensitive element of a film unit, moving said image to maintain said image stationary with respect to said photosensitive element during movement and exposure thereof;

a pair of rolls mounted in juxtaposition for rotation about axes located substantially in a plane;

drive means coupled with one of said rolls for rotating said one roll in frictional engagement with a photographic film unit engaged between said rolls to move said film unit in one direction; and means coupling the other of said rolls in driving relation to said exposure means to move said image in response to rotation of said other roll;

said rolls being spaced from one another by a minimum distance less than the minimum thickness of said film unit such that said other roll is rotated to drive said exposure means only when a film unit is being moved between and in engagement with said rolls.

9. Photographic apparatus as defined in claim 8 including means for reversing the direction of rotation of said one roller following exposure of said photosensitive element to move said film unit in said opposite direction between said rolls.

10. Photographic apparatus as defined in claim 9 including obturator means movable into the path of light transmitted by said exposure means for preventing exposure of said photosensitive element, said other roll being coupled in driving relation with said obturator means to move the latter into said light path during the terminal portion of movement of said film unit in said one direction to prevent exposure of said photosensitive element during movement of said film unit in said opposite direction.

11. The method of exposing and processing a photographic film unit including a photosensitive element and a rupturable container of processing liquid, said container including an elongated cavity filled with said processing liquid and portions defining a sealed discharge passage approximately equal in length to said cavity and adapted to become unsealed in response to generation of hydraulic pressure within said processing liquid to provide for the unidirectional discharge of said liquid from said container, and being coupled with said photosensitive element near a margin of the area of said photosensitive element adapted to be exposed and processed, said method comprising the steps of:

engaging the end of said film unit opposite said container between a pair of juxtaposed rolls and rotating at least one of said rolls to advance said film unit, including said container, in one direction between said rolls;

during advancement of said film unit in said one direction between said rolls, urging said rolls toward one another with a force sufficient to insure frictional engagement with said film unit yet insufficient to rupture said container during movement thereof between said rolls;

exposing an area of said photosensitive element to form an image therein during advancement of said film assemblage in said first direction;

following exposure of said photosensitive element and movement of said container in said first direction between said rolls, rotating said rolls to advance said film unit in the opposite direction between said rolls;

during movement of said film unit in said opposite direction urging said rolls toward one another with a force sufficient to rupture said container and discharge its liquid contents for distribution in contact with said exposed area of said photosensitive element; and distributing said liquid contents of said container in contact with said exposed area of said photosensitive element.

12. The method defined in claim 11 wherein compressive pressure is applied to the liquid-filled cavity of said container uniformly throughout the length of said cavity to distribute said liquid uniformly within said cavity during advancement of said container between said rolls in said first direction.

13. The method defined in claim 12 wherein the direction of rotation of said rolls is reversed immediately upon completion of exposure of said area of said photosensitive element.

References Cited

UNITED STATES PATENTS 3,350,990  11/1967  Finelli et al. _________ 95—13
3,369,470  2/1968  Downey _____________ 95—13

NORTON ANSHER, Primary Examiner

RICHARD L. MOSES, Assistant Examiner